J. B. PATTERSON.
WIRE STRETCHER.
APPLICATION FILED JULY 12, 1917.
1,279,752.
Patented Sept. 24, 1918.
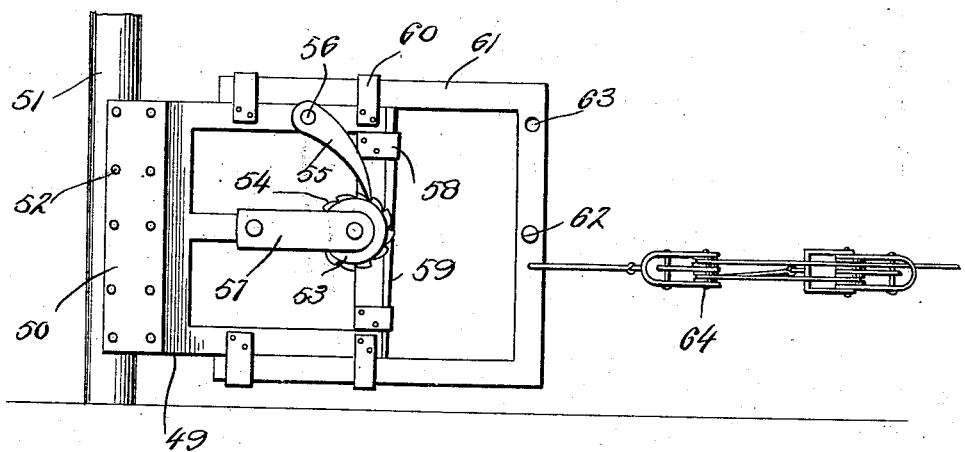
WITNESSES
INVENTOR
John B. Patterson.
BY
ATTORNEY

UNITED STATES PATENT OFFICE.

JOHN B. PATTERSON, OF PRIMGHAR, IOWA, ASSIGNOR OF ONE-HALF TO HELEN A. PATTERSON, OF PRIMGHAR, IOWA.

WIRE-STRETCHER.

1,279,752.  Specification of Letters Patent.  Patented Sept. 24, 1918.

Application filed July 12, 1917. Serial No. 180,187.

*To all whom it may concern:*

Be it known that I, JOHN B. PATTERSON, citizen of the United States, residing at Primghar, in the county of O'Brien and State of Iowa, have invented certain new and useful Improvements in Wire-Stretchers, of which the following is a specification.

This invention relates to wire stretching mechanisms, and aims to provide a structure of simple construction and comprising few parts, which may be readily applied to or removed from a fence post or other base, and which embodies novel means for obtaining a great amount of tensioning power from a small amount of exertion expended.

With these objects in view together with others which will appear as the description proceeds, the invention resides in the novel construction, combination and arrangement of parts, all as will be described more fully hereinafter, illustrated in the drawing and particularly pointed out in the claims.

In the drawing:—

The figure represents a side elevation of a wire stretching mechanism constructed in accordance with the invention.

In the drawing, 49 indicates a supporting frame having a plate 50 secured to one edge, and by means of which the frame may be secured to the post 51. Nails 52 may be driven through the plate 50 for the purpose of attaching the frame to the post. A drum 53 is rotatably mounted on the frame near the outer end thereof, and is provided with a ratchet wheel 54 to be engaged by a pawl 55 pivotally connected to the frame as at 56. This drum is arranged midway the longitudinal edges of the frame, and is to be rotated by means of the crank handle 57. A suitable cable or rope, not shown, may be secured to the drum for the purpose of engaging with the wire to be stretched. Straps 58 are connected to the outer end of the frame, and carry a stake 59 which is designed to be driven into the ground. Straps or loops 60 are connected to the upper and lower sides of the frame 49, and the arms of a supplemental frame 61 are slidable in these loops 60. This frame 61 is provided at its outer end with a shaft 62 adapted to receive the drum 53 and a pin 63 may be secured to the said supplemental frame to carry the pawl 55. A block and tackle, indicated generally at 64, is connected to the frame 61 for the purpose of securing heavy wire or cables to the frame.

From the foregoing it is obvious that I have provided an extension or supplemental frame whereby the stretching drum may be spaced a greater or less distance from the post. When the extension frame is used, the stake 59 will be in the position illustrated in the drawing, but when the extension frame is not in use, the stake may be driven into the ground to securely hold the frame in proper position. When the extension frame is used, the drum 53 will be removed from the frame 49 and placed upon the shaft 62. The pawl 55 will be placed upon the pin 63, whereby it will be positioned so as to engage the ratchet wheel 54 carried by the drum 53. When using the extension frame, the rope of the block and tackle may be secured to a suitable object, whereby the strain on the cable carried by the drum will not cause the extension frame to collapse over the frame 49.

Having thus fully described my invention, what I claim as new and desire to secure by Letters Patent is:—

1. A wire stretcher comprising a frame, a plate secured to each side of the frame and extending beyond the edge thereof, a second frame adjustably connected to the first frame, a drum interchangeable from one frame to the other, a ratchet wheel secured to the drum, a pawl interchangeable from one frame to the other and adapted to engage the ratchet wheel, a cable connected to the drum, and a clamp connected to the cable.

2. In a wire stretcher, a main frame adapted to be secured to a post, strap members projecting laterally from said main frame, a second frame comprising longitudinal bars adapted to engage over and slide upon the corresponding bars of the main frame and to be confined by said strap members, and a stretching drum designed to be attached to either of said main or second frames.

3. In a wire stretcher, a main frame adapted to be secured to a post, strap members projecting laterally from said main frame, a second frame comprising longitudinal bars adapted to engage over and slide upon the corresponding bars of said main frame and to be confined by said strap members, the lateral bars of said main and second frames being provided with spaced apertures, a stretching drum designed to be rotatably mounted in certain of said apertures, and a pawl designed to be rotatably mounted in the other apertures.

In testimony whereof I affix my signature in presence of two witnesses.

JOHN B. PATTERSON.

Witnesses:
HENRY RERICK,
KENNETH H. RERICK.

Copies of this patent may be obtained for five cents each, by addressing the "Commissioner of Patents, Washington, D. C."